June 11, 1929.   J. S. THOMPSON   1,716,393
FRICTION BRAKE
Filed April 7, 1926
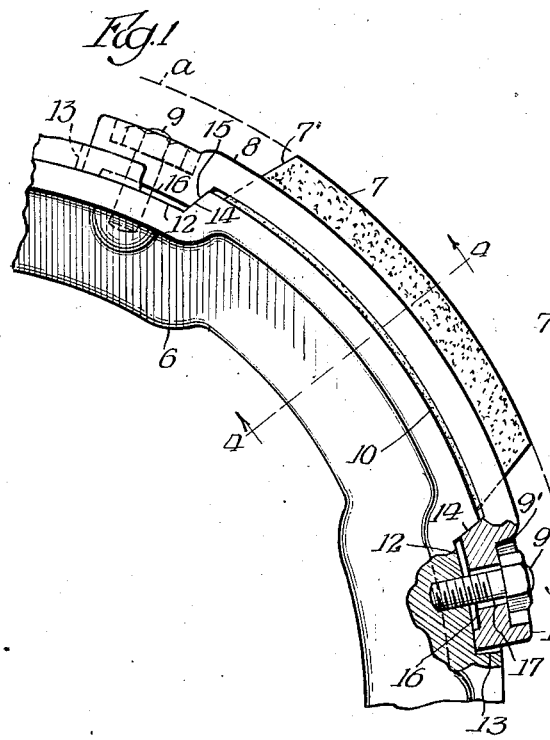
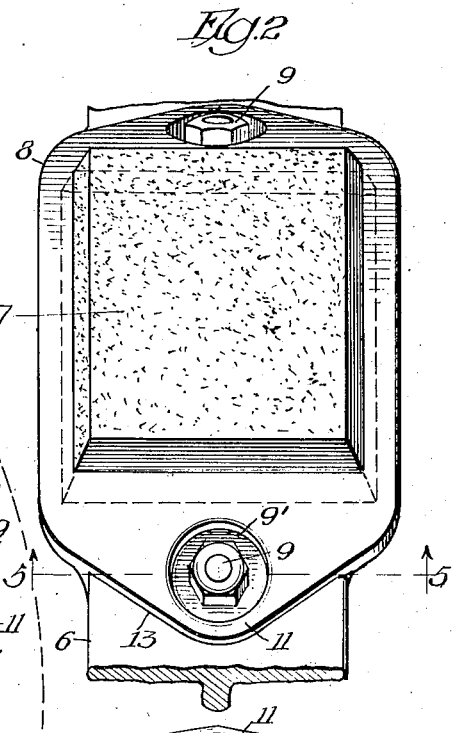
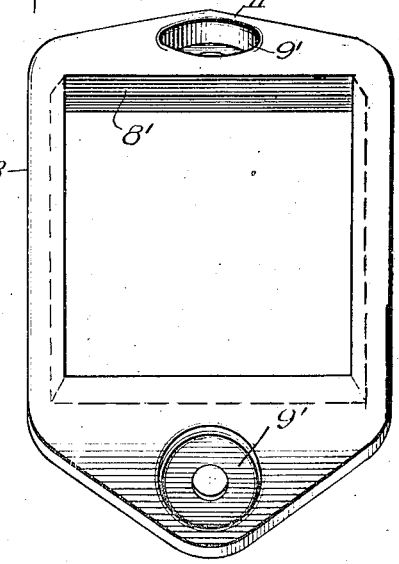
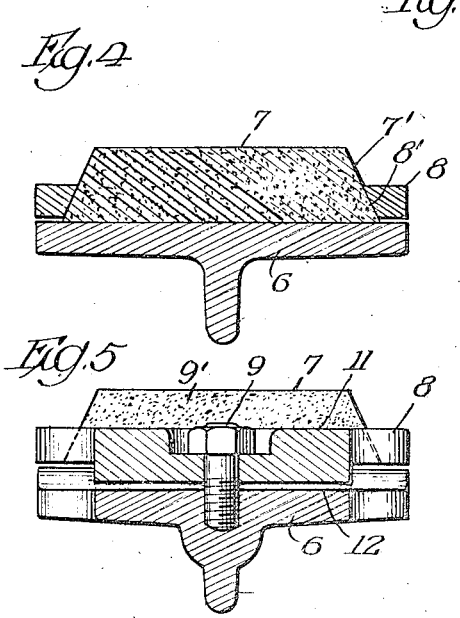
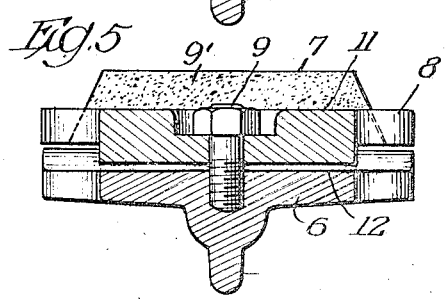

Patented June 11, 1929.

1,716,393

UNITED STATES PATENT OFFICE.

JAMES S. THOMPSON, OF NEW YORK, N. Y., ASSIGNOR TO AMERICAN BRAKE MATERIALS CORPORATION, OF NEW YORK, N. Y., A CORPORATION OF NEW YORK.

FRICTION BRAKE.

Application filed April 7, 1926. Serial No. 100,299.

This invention relates to friction brakes and while it is particularly adapted for expanding brakes arranged to make frictional contact with a drum, which is a form of brake commonly employed in automotive vehicles, it is also useful in many other installations, as will be apparent to those skilled in the art.

The object of the invention is to provide a simple means for rigidly securing a friction shoe in proper position on a brake head.

A further object of the invention is to provide fastening means of simple construction to facilitate replacement of a friction shoe on a brake head.

In the accompanying drawings I have illustrated a selected embodiment of the invention and referring thereto;

Fig. 1 is a sectional view showing part of a brake head with a shoe secured in place thereon.

Fig. 2 is a plan view of Fig. 1.

Fig 3 is a plan view of the keeper.

Fig. 4 is a sectional view on the line 4—4 of Fig. 1.

Fig. 5 is a sectional view on the line 5—5 of Fig. 1.

Referring to the drawings 6 is the brake head, 7 is the friction shoe, 8 is the keeper and 9 are the bolts for fastening the keeper to the head.

I may make the head and the shoe in any shape suitable for a particular friction brake and therefore I have shown only in the drawings that portion of a head which supplies the arcuate seat 10 for the shoe. The shoe is also arcuate in shape and is preferably heat resistant and wear resistant. I prefer to employ a composition shoe, but so far as this invention is concerned it may be made of any suitable material.

The keeper is made in the form of a rectangular yoke and a convenient means for engaging the yoke with the shoe is provided by beveling the sides and ends of the shoe at 7' and correspondingly beveling the sides and ends of the yoke at 8' to engage the bevel sides and ends of the shoe. For some purposes it may be sufficient to bevel the sides only, or the ends only, of the shoe and correspondingly bevel the yoke. The ends 11 of the keeper are preferably tapered and thickened to project below the intermediate portion and below the shoe seat when the parts are assembled. The head is recessed at 12 to receive the enlarged ends of the keeper and these parts are preferably proportioned so that when the enlarged ends of the keeper are seated in the recesses in the head the intermediate yoke part of the keeper will be operatively disposed with relation to the shoe and the seat. The ends of the keeper are preferably spaced from the outer end walls 13 of the recesses 12 to avoid an exact nicety of fit and to permit the keeper to be easily applied and removed from the head. The inner walls 14 of the recesses 12 preferably extend transversely across the head and are beveled, Fig. 1, complementary to the beveled inner walls 15 of the enlarged ends of the keeper. These bevel parts 15 of the keeper engaging the bevel parts 14 of the head provide for proper registration of the keeper on the head and maintain the keeper in proper relation to the head. The bevel walls or shoulders 14 constitute, in effect, a bearing with which the bevel walls or shoulders 15 of the keeper engage so that the keeper will easily find its proper position on the head and can be adjusted as tightly as may be desired. Thus the oppositely disposed shoulders 14 constitute a bevel seat for the yoke and the bevel shoulders 15 of the yoke engage this bevel seat and are adapted to slide on the seat to a desired tight fit. When the keeper is securely fastened to the head the shoulders 14 and 15 will prevent endwise movement of the shoe and keeper, and the shoulders 13 will prevent lateral movement of the shoe and the keeper on the head. In the drawings I have shown a portion of a head for an internal brake and the keeper is secured to the head by bolts 9 passing through the enlarged ends of the keeper and into the head in a direction radial of the drum indicated by the broken line $a$ in which the head operates. The heads of the bolts are seated in the recesses 9' so that they will not engage the drum after the shoe has worn down.

My invention enables the use of a shoe without any means except its marginal faces for engagement with the devices which secure it to the head; and I may use a shoe without a steel back of any kind, or with a steel back if desired. The parts are easily removed and assembled for replacing a shoe. The means for fastening the keeper are disposed substantially radial of the drum and of the arc of the shoe, and this arrangement serves to hold the keeper against longitudinal or lateral displacement even though there may be a relatively large clearance between the keeper and the walls 13, 13 of the recesses in the head to permit the keeper to be freely arranged on or removed from the head. The bevel walls 14 at the ends of the seat 10 constitute a sliding bearing for the keeper whereby it may be rigidly secured in place by tightening the bolts. I prefer to cut away the under side of the enlarged ends of the keeper at 16 to provide a clearance between those portions of the enlarged ends adjacent the bevel shoulders 15 and the bottom of the recesses 12 so that the bolts may be tightened and the keeper may yield in the space provided by this clearance to obtain a tight fit of the keeper on the head. And I also prefer to provide enlarged openings 17 in the keeper to receive the bolts 9.

I am aware that changes in the form, construction and arrangements of parts may be made without departing from the spirit and without sacrificing the advantages of the invention and I reserve the right to make all such changes as fairly fall within the scope of the following claims:

I claim:

1. In a friction brake, the combination of a brake head, a friction shoe, a single keeper for retaining the shoe on the head, and radially disposed bolts for securing the keeper to the head.

2. In a friction brake, the combination of a brake head, a friction shoe, a keeper engaging the shoe and having extended ends, and radially disposed fastening means at said ends for securing the keeper to the head.

3. In a friction brake, the combination of a brake head, having recesses therein, a friction shoe, a keeper engaging the shoe and having enlarged ends to engage said recesses, and means engaging said ends for securing the keeper to the head.

4. In a friction brake, the combination of a brake head having transverse recesses therein, a friction shoe, a keeper engaging the shoe and having enlarged ends to engage said recesses, and means for securing the keeper to the head.

5. In a friction brake, the combination of a brake head having recesses therein, a friction shoe, a keeper engaging the shoe and having enlarged ends to engage said recesses, and radially disposed bolts engaging said ends for securing the keeper to the head.

6. In a friction brake, the combination of a brake head having a shoe seat and bevel shoulders at the ends of said seat, a friction shoe, a keeper engaging the shoe and having bevel shoulders to engage the bevel shoulders on the head, and radially disposed fastening means engaging the keeper at the ends thereof for securing the keeper to the head.

7. In a friction brake, the combination of a brake head having recesses therein, a friction shoe, a keper engaging the shoe and having ends in said recesses, the inner walls of the recesses and the inner walls of said ends being beveled, there being a clearance between each end and the outer wall of its recess, and means for securing the keeper to the head.

8. In a friction brake, the combination of a brake head having recesses therein, a friction shoe, a keeper engaging the shoe and having enlarged ends to engage said recesses, there being a clearance between said ends and the outer ends of the recesses, and means for securing the keeper to the head.

JAMES S. THOMPSON.